(12) United States Patent
Choi

(10) Patent No.: US 7,611,003 B2
(45) Date of Patent: Nov. 3, 2009

(54) APPARATUS FOR BRAKING COUNTER SHAFT OF TRANSMISSION

(75) Inventor: Chi Hwan Choi, Hwaseong (KR)

(73) Assignee: Hyundai Motor Company, Seoul (KR)

( * ) Notice: Subject to any disclaimer, the term of this patent is extended or adjusted under 35 U.S.C. 154(b) by 401 days.

(21) Appl. No.: 11/603,868

(22) Filed: Nov. 22, 2006

(65) Prior Publication Data
US 2008/0073173 A1 Mar. 27, 2008

(30) Foreign Application Priority Data
Sep. 21, 2006 (KR) .................. 10-2006-0091911

(51) Int. Cl.
*B60W 10/02* (2006.01)
(52) U.S. Cl. .................. 192/13 R; 74/411.5
(58) Field of Classification Search ............. 192/13 R, 192/218; 74/411.5; 475/900, 154; 477/59, 477/60, 94, 124, 182
See application file for complete search history.

(56) References Cited

U.S. PATENT DOCUMENTS

| 1,820,961 | A | * | 9/1931 | Church | ................. | 192/13 R |
| 1,975,626 | A | * | 10/1934 | Tibbetts | ................. | 192/18 R |
| 4,294,338 | A | * | 10/1981 | Simmons | ................. | 74/339 |
| 6,017,291 | A | * | 1/2000 | Ailes et al. | ................. | 477/124 |
| 6,080,081 | A | * | 6/2000 | Sauermann et al. | ................. | 477/79 |
| 7,000,748 | B2 | * | 2/2006 | Hornbrook et al. | ................. | 192/13 R |
| 7,077,024 | B2 | * | 7/2006 | Lauri et al. | ................. | 74/325 |
| 2007/0137964 | A1 | * | 6/2007 | Kummer et al. | ................. | 192/13 R |

* cited by examiner

*Primary Examiner*—Richard M. Lorence
*Assistant Examiner*—Justin Holmes
(74) *Attorney, Agent, or Firm*—Morgan, Lewis & Bockius LLP

(57) ABSTRACT

An apparatus for braking a counter shaft of a transmission, where the apparatus can cut off power delivery to the transmission and simultaneously reduce a rotation speed of the counter shaft for an easier gear shift. The apparatus includes: a transmission case; a counter shaft in the transmission case; a counter shaft brake that is engaged with the counter shaft and variably stops the counter shaft; and a counter shaft brake operating fork for operating the counter shaft brake.

7 Claims, 4 Drawing Sheets

APPARATUS FOR BRAKING COUNTER SHAFT OF TRANSMISSION

CROSS-REFERENCE TO RELATED APPLICATION

This application claims priority to and the benefit of Korean Patent Application No. 10-2006-0091911 filed in the Korean Intellectual Property Office on Sep. 21, 2006, the entire contents of which are incorporated herein by reference.

BACKGROUND OF THE INVENTION (a) Field of the Invention

The present invention relates to an apparatus for braking a counter shaft of a transmission. More particularly, the present invention relates to an apparatus that can cut off power delivery to the transmission and simultaneously reduce a rotation speed of the counter shaft for an easier gear shift.

(b) Description of the Related Art

In general, when a driver steps on a clutch pedal, power delivery from an engine to a transmission is cut off. After a synchronizer synchronizes gears of the transmission, when the driver takes his foot off the clutch pedal, the power of the engine is delivered to the transmission again.

A conventional transmission is provided with a main axis that is horizontally located in the middle of a transmission case and a counter shaft parallel to the main axis. The transmission case is provided with operating members, including gears.

A clutch release shaft is provided between the main axis and the counter shaft, and a clutch release fork is bolted to the clutch release shaft.

The clutch release shaft is rotated by an operation rod located exterior to the transmission. Consequently, the clutch release fork that is fixed to the clutch release shaft is also rotated, and thus the clutch is released from a torque converter. Accordingly, power delivery from the engine to the transmission is cut off.

However, even when power delivery is cut off, the gears in the transmission rotate before changing gears due to inertia. During such a shifting operation, the gears are synchronized by friction with a synchronizer and shifted.

As a result, the synchronizer is easily worn away, and shift feel is deteriorated. In addition, shift failure can occur due to abrasion of the synchronizer.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention provides an apparatus for braking a counter shaft of a transmission that simultaneously cuts off power delivery to the transmission and reduces a rotation speed of the counter shaft for an easier gear shift.

An exemplary embodiment of the-present invention provides an apparatus for braking a counter shaft of a transmission that includes: a transmission case; a counter shaft that is horizontally located in the transmission case; a counter shaft brake that is engaged with the counter shaft and variably stops the counter shaft; and a counter shaft brake operating fork for operating the counter shaft brake.

The counter shaft brake operating fork can be integrally formed with a clutch release fork.

The counter shaft brake operating fork and the clutch release fork can be simultaneously operated by a clutch release shaft.

A side portion of the counter shaft can be extended outward of the transmission case, and the counter shaft brake can be engaged with the extended side portion of the counter shaft.

The counter shaft brake can be splined with the counter shaft.

A groove for guiding the counter shaft brake operating fork can be formed on an exterior circumference of the counter shaft brake, and a friction member can be provided on a side face of the counter shaft brake.

A protruding portion that is inserted into the groove can be formed on the counter shaft brake operating fork.

The clutch release fork and the counter shaft brake operating fork can be simultaneously operated so as to cut off power delivery to the transmission and simultaneously reduce a rotation speed of the counter shaft.

The friction member can closely contact the transmission case so as to reduce a rotation speed of the counter shaft when the counter shaft brake operating fork is operated.

The counter shaft brake operating fork can push the counter shaft brake toward the transmission case by an operation of the clutch release shaft.

The clutch release shaft can be operated by an operation rod that is provided at an exterior of the transmission case.

The clutch release shaft can be bolted to the counter shaft brake operating fork.

DETAILED DESCRIPTION OF THE PREFERRED EMBODIMENTS

Exemplary embodiments of the present invention will hereinafter be described in detail with reference to the accompanying drawings.

Figure 1:
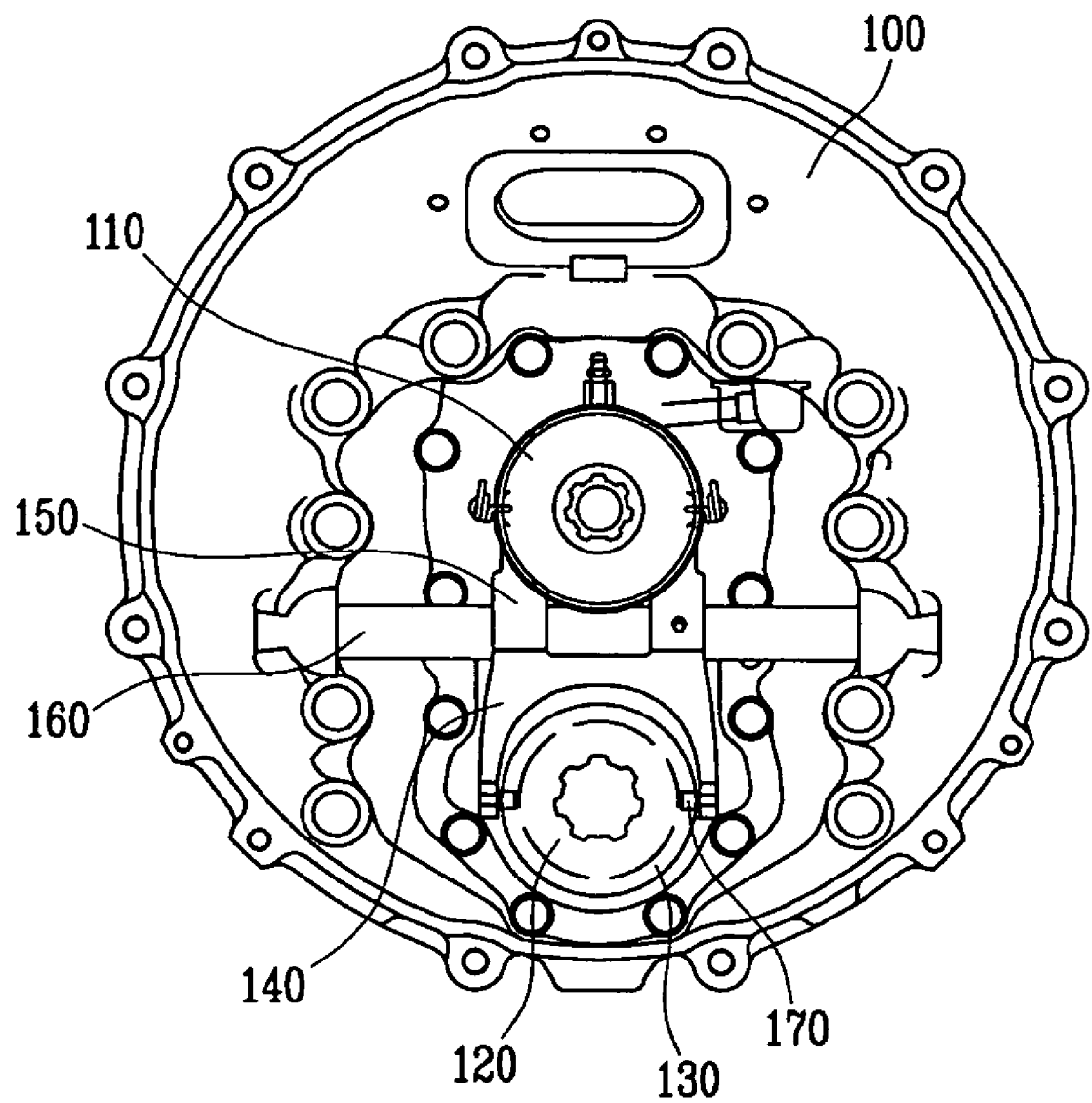
FIG. 1 is a front view showing a mounting structure of a counter shaft, a clutch release fork, and a fork for operating the counter shaft in a transmission consistent with an exemplary embodiment of the present invention.
Figure 2:
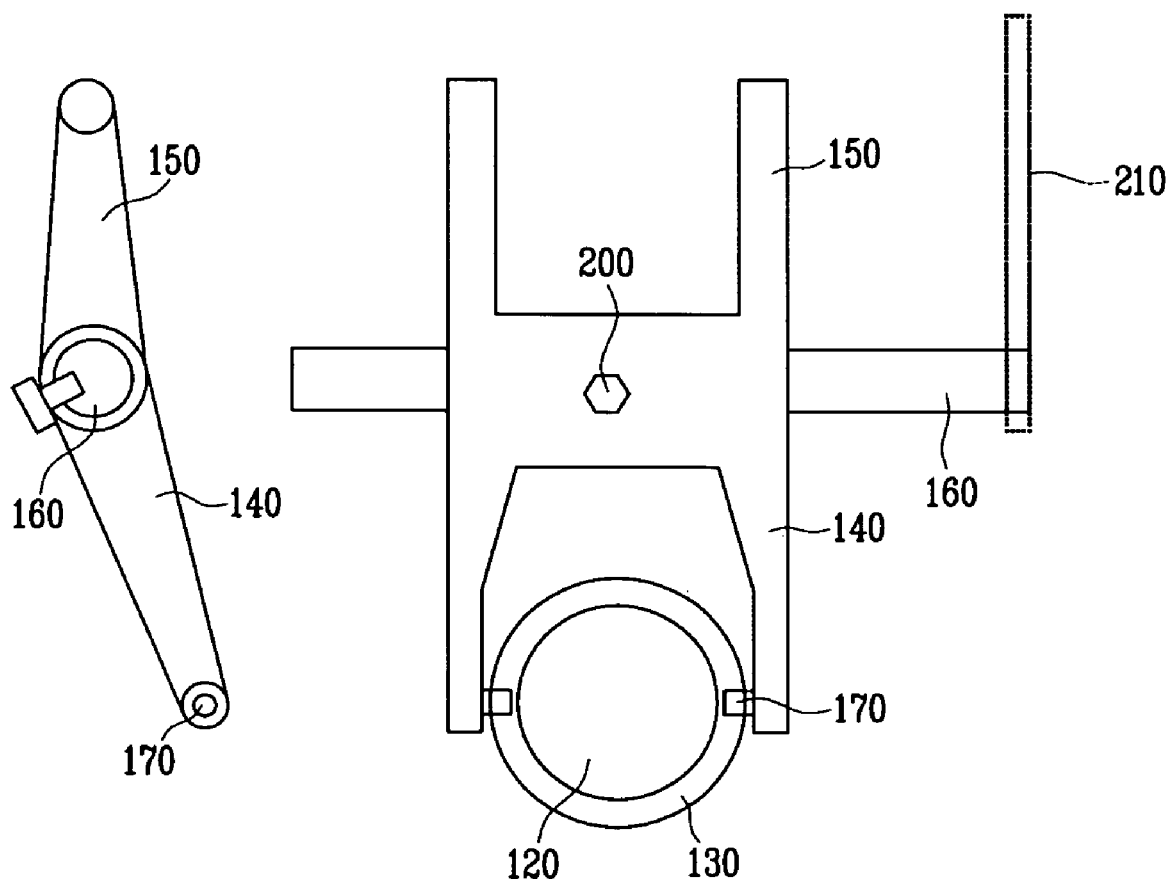
FIG. 2 is a side view and a front view showing a structure of a clutch release fork and a fork for operating a counter shaft consistent with an exemplary embodiment of the present invention.

As shown in FIG. 1 and FIG. 2, exemplary embodiments of the present invention provide with a main axis 110 that is horizontally located in the middle of a transmission case 100 and a counter shaft 120 that is parallel to with the main axis 110. The transmission case 100 is provided with operating member, including a plurality of gears.

Figure 3:
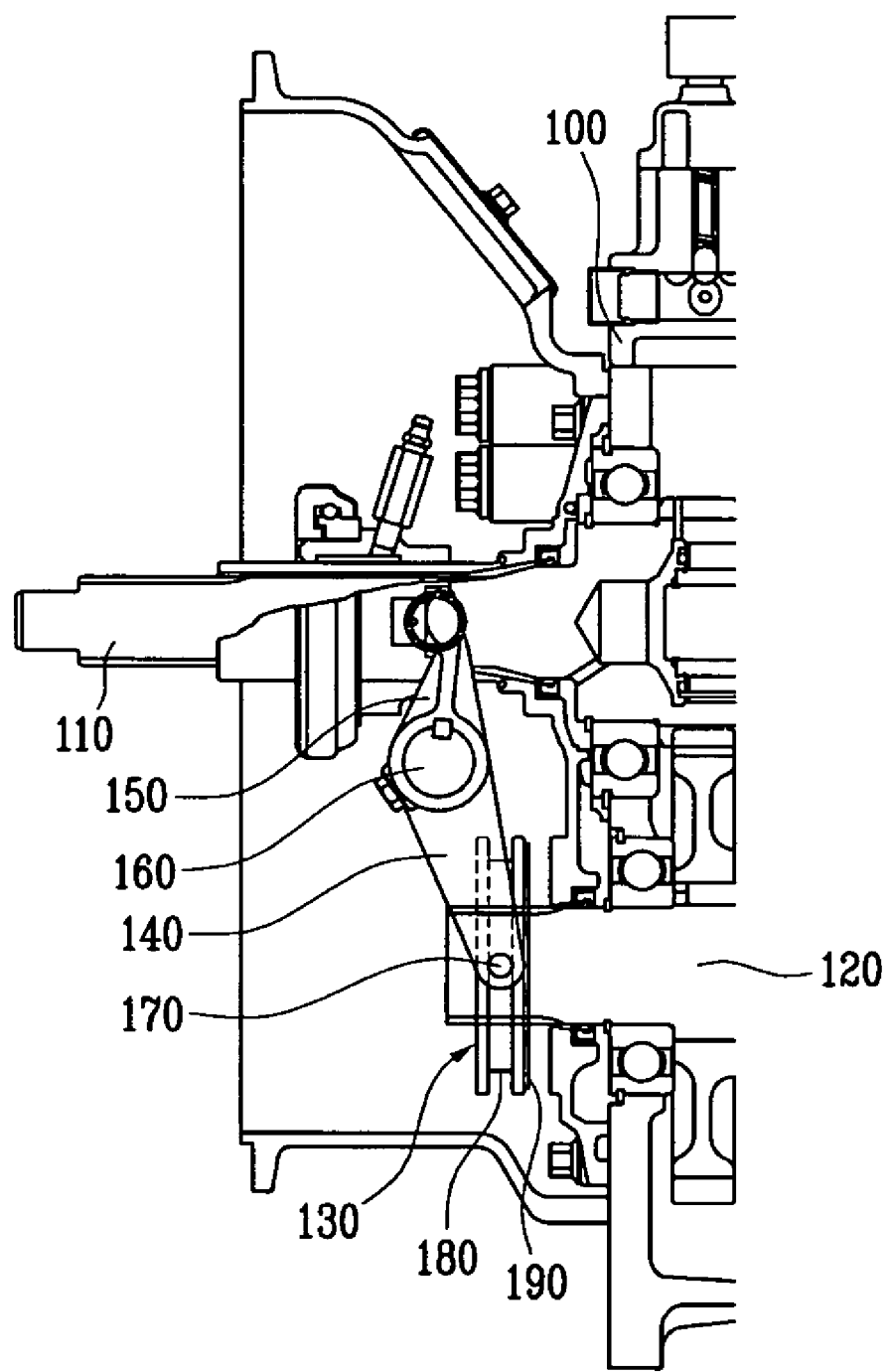
FIG. 3 is a partial cross-sectional view showing a non-operating state of an apparatus for braking a counter shaft of a transmission consistent with an exemplary embodiment of the present invention.
Figure 4:
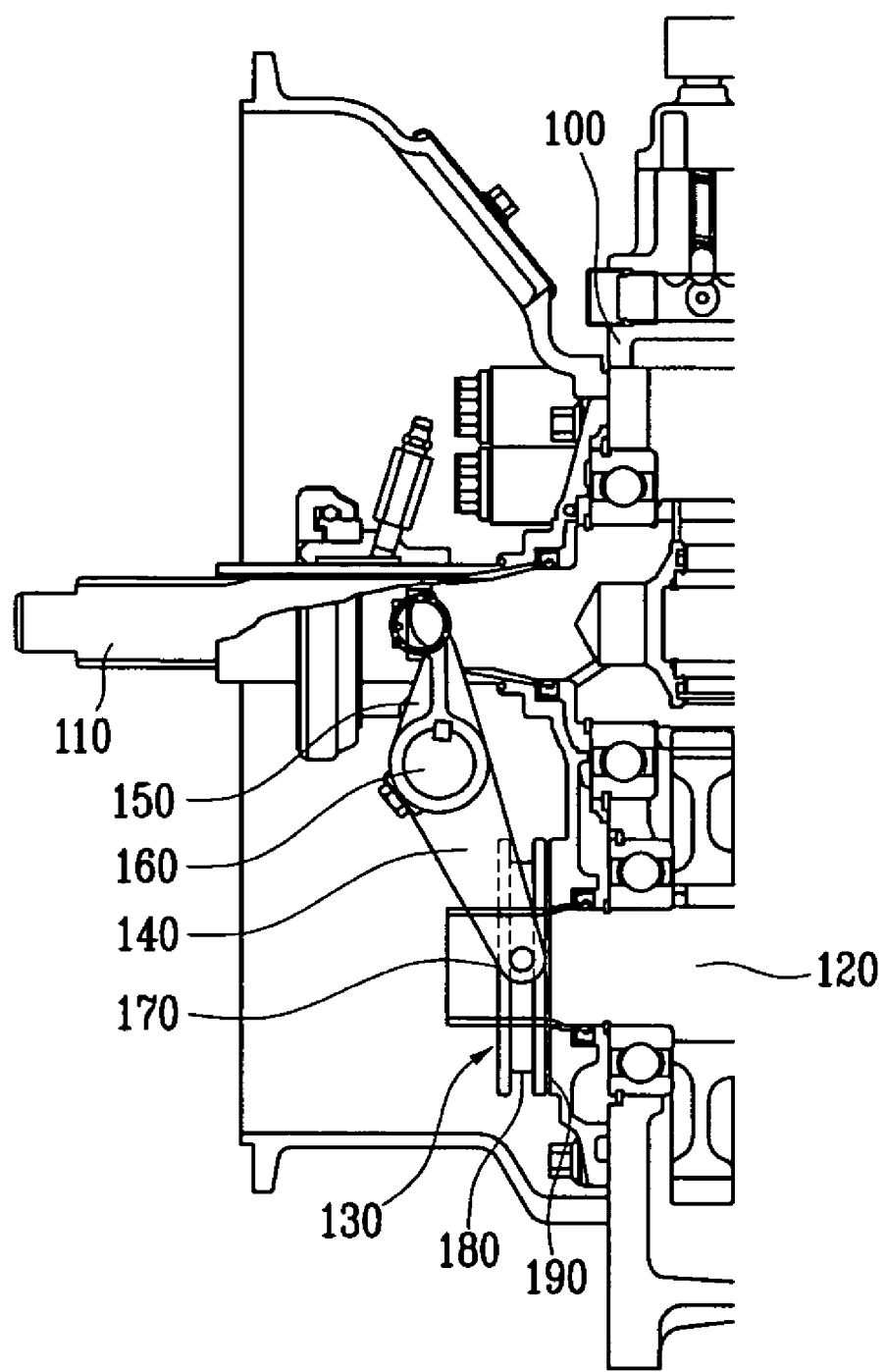
FIG. 4 is a partial cross-sectional view showing an operating state of an apparatus for braking a counter shaft of a transmission consistent with an exemplary embodiment of the present invention.

As shown in FIG. 3 and FIG. 4, a side portion of the counter shaft 120 extends outward of the transmission case 100, and a counter shaft brake 130 is engaged with the extended side portion of the counter shaft 120.

The counter shaft brake 130 can be splined with the counter shaft 120.

A cylinder-shaped groove 180 is formed on an exterior circumference of the counter shaft brake 130, and a friction member 190 is provided on a side face of the counter shaft brake 130.

A clutch release shaft 160 is provided between the main axis 110 and the counter shaft 120, and a clutch release fork 150 and a counter shaft brake operating fork 140 are fixed to the clutch release shaft 160 by a bolt 200. Accordingly, the counter shaft brake operating fork 140 and the clutch release fork 150 can be simultaneously operated by the clutch release shaft 160. The clutch release shaft 160 is operated by an operation rod 210 that is provided at an exterior of the transmission case 100. The operation rod 210 can be connected to a clutch pedal and operates the clutch release shaft 160 by operation of the clutch pedal, or it can be connected to another operation lever and operate the clutch release shaft 160 by operation of the operation lever.

The counter shaft brake operating fork 140 can be integrally formed with the clutch release fork 150. The clutch release shaft 160 can be bolted to the counter shaft brake operating fork 140.

An end portion of the clutch release fork 150 is connected to the clutch, and the other end portion thereof is engaged or integrally formed with the counter shaft brake operating fork 140.

The counter shaft brake operating fork 140 is provided with a protruding portion 170 at one end portion thereof, and the other end portion is engaged with or integrally formed with the clutch release fork 150.

The protruding portion 170 is inserted into the groove 180.

As shown in FIG. 3, in the non-operating state, the clutch is engaged with the torque converter, and thus power of the engine is transferred to the main axis 110. The counter shaft 120 and the counter shaft brake 130 are rotated by the gears in the transmission.

The counter shaft brake 130 is spaced apart from the transmission case 100, and thus it does not apply a frictional force to the counter shaft 120.

The protruding portion 170 of the counter shaft brake operating fork 140 is inserted into the groove 180. Accordingly, when the counter shaft brake 130 rotates, the protruding portion 170 slides along the groove 180.

As shown in FIG. 4, when the operation rod 210 rotates the clutch release shaft 160, the clutch release fork 150 that is fixed to the clutch release shaft 160 is rotated and releases the clutch from the torque converter. Consequently, power delivery from the engine to the transmission is cut off.

Simultaneously, the counter shaft brake operating fork 140 is rotated and pushes the counter shaft brake 130 to the transmission case 100, and thus the counter shaft brake 130 is contacted with the transmission case 100.

A frictional force is generated between the transmission case 100 and the friction member 190, and the rotation speed of the counter shaft 120 is lowered by the frictional force. Consequently, the rotation speed of the operating members, such as gears, that are connected with the counter shaft 120 is lowered, and thus the shift shock on the synchronizer can be reduced.

According to an exemplary embodiment of the present invention, when power delivery to the transmission is cut off, the rotation speed of the counter shaft can be simultaneously reduced, and thus the gear shift can be easily performed. In addition, the shift shock on the synchronizer can be reduced, and thus early abrasion of the synchronizer can be prevented so as to increase the life-time of the synchronizer. Furthermore, crash noise and shift failure due to a lack of capacity of the synchronizer can be prevented, and thus shift feel can be improved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An apparatus for braking a counter shaft of a transmission, comprising:
   a transmission case;
   the counter shaft in the transmission case;
   a counter shaft brake that is engaged with the counter shaft and variably stops the counter shaft;
   a counter shaft brake operating fork for operating the counter shaft brake;
   a clutch release fork directly attached to the counter shaft brake operating fork;
   a clutch release shaft for operating both the counter shaft brake operating fork and the clutch release fork at the same time so as to cut off power delivery to the transmission and simultaneously reduce a rotation speed of the counter shaft,
   wherein the counter shaft comprises a side portion extending outward of the transmission case, and the counter shaft brake is engaged with the side portion of the counter shaft, and
   wherein the counter shaft brake comprises a groove for guiding the counter shaft brake operating fork, and a friction member.

2. The apparatus of claim 1, wherein the counter shaft brake is splined with the counter shaft.

3. The apparatus of claim 1, wherein the counter shaft brake operating fork comprises a protruding portion that is inserted into the groove.

4. The apparatus of claim 1, wherein the friction member closely contacts the transmission case, whereby a rotation speed of the counter shaft is reduced when the counter shaft brake operating fork is operated.

5. The apparatus of claim 4, wherein the counter shaft brake operating fork pushes the counter shaft brake toward the transmission case by an operation of the clutch release shaft.

6. The apparatus of claim 1, further comprising an operation rod at an exterior of the transmission case, wherein the operation rod operates the clutch release shaft.

7. The apparatus of claim 6, wherein the clutch release shaft is attached to the counter shaft brake operating fork.

* * * * *